Sept. 29, 1942. G. KARL 2,297,479
BEAM FOR CULTIVATING ATTACHMENTS
Filed May 21, 1940
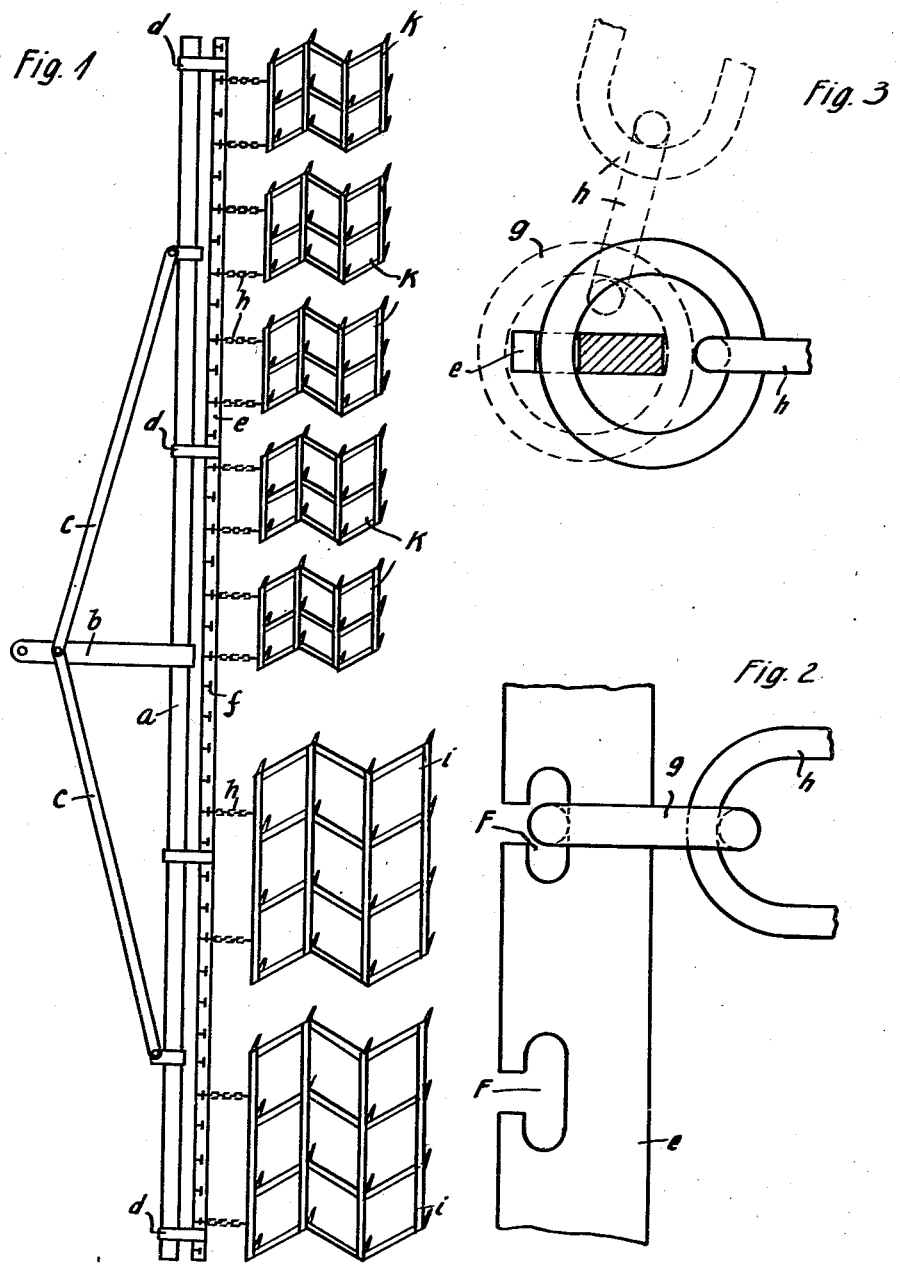

Patented Sept. 29, 1942

2,297,479

UNITED STATES PATENT OFFICE 2,297,479

BEAM FOR CULTIVATING ATTACHMENTS

Georg Karl, Schweinfurt-on-the-Main, Germany;
vested in the Alien Property Custodian Application May 21, 1940, Serial No. 336,369
In Germany May 23, 1939

1 Claim. (Cl. 55—84)

With the known motor tractor beams for cultivating attachments, especially for harrows, it is very unpracticable to change or attach the chains for the harrow units, for instance in cases where after working with heavy field tools the tractor beam has to be used for light sowing-, weeder-, or other harrows.

The present invention allows using the traction beam without any change as well for large and heavy as for small and light harrow units and, moreover, all other cultivating appliances such as field sleds, hay harrows, manure spreaders, etc. and even several cultivators may be attached side by side.

The annexed drawing shows an example of a design of such a traction beam with attached harrow units.

Fig. 1 is a diagrammatic view of the traction beam with harrow units,

Fig. 2 shows the shape of the recesses of the parallel beam, and

Fig. 3 is a section through the parallel beam with attached ring and chain.

In the present example, a traction beam $a$ is shown connected to a parallel beam $e$ to the left half of which are attached two heavy field harrow-units $i$ whereas to the right half five light sowing harrow-units $k$ are attached. The traction beam consists of the beam proper $a$ with a drag-iron $b$ and two brace members $c$. The parallel beam $e$ is rigidly connected with the beam $a$ by means of four connecting irons $d$. The parallel beam has T-shaped recesses $f$ as shown in Fig. 2 into which rings $g$ with chains $h$ are attached. The rings $g$ on the chains $h$ have an inner diameter which corresponds to the width of the parallel beam $e$, so that—as shown in Fig. 3—during the re-attaching the chain $h$ has to be moved upwardly to a certain extent, in order to be able to switch it from one recess $f$ into another. By this design, it is almost made impossible that during the work—especially during the turning—the rings $g$ with the chains $h$ may slip out by themselves from the recess $f$.

The parallel beam $e$ is connected with the connecting iron $d$ by means of screws, bolts, or similar fixing means and arranged in a detachable manner, in order to be able to shove over the beam more or less chains $h$ with rings $g$ as required and to attach same at any desired places.

Having described my invention what I claim and desire to secure by Letters Patent is:

In field cultivating attachments having chains for harrow units; a traction beam, and another beam connected with said traction beam and extending parallel thereto, said other beam having T-shaped openings formed therein for attaching the chain rings, said chain rings having an inner diameter which is substantially equal to the width of said other beam.

GEORG KARL.